(12) United States Patent
Auzias et al.

(10) Patent No.: US 8,783,729 B2
(45) Date of Patent: Jul. 22, 2014

(54) COUPLING SYSTEM INCLUDING A SAFETY FASTENER DEVICE

(71) Applicant: Turbomeca, Bordes (FR)

(72) Inventors: Benoit Michel Bernard Vincent Auzias, Asson (FR); Francis Jean Criado, Pau (FR); Gerald Andre Charles Senger, Morlaas-Berlanne (FR)

(73) Assignee: Turbomeca, Bordes (FR)

( * ) Notice: Subject to any disclaimer, the term of this patent is extended or adjusted under 35 U.S.C. 154(b) by 0 days.

(21) Appl. No.: 13/874,912

(22) Filed: May 1, 2013

(65) Prior Publication Data

US 2013/0241195 A1    Sep. 19, 2013

Related U.S. Application Data

(62) Division of application No. 12/136,402, filed on Jun. 10, 2008, now Pat. No. 8,459,699.

(30) Foreign Application Priority Data

Jun. 11, 2007  (FR) ..................................... 07 55636

(51) Int. Cl.
*F16L 35/00* (2006.01)

(52) U.S. Cl.
USPC ............. 285/2; 285/117; 285/401; 285/288.5

(58) Field of Classification Search
USPC ................. 285/117, 288.1, 288.5, 288.6, 1, 2, 285/288.8, 288.9, 288.11, 114, 115, 116, 285/289.1–289.4, 412–416, 119, 425, 285/123.1, 15, 284.1, 81, 376, 209, 292.1, 285/360, 401; 403/2, 265, 267, 270–272; 29/890.08; 60/320; 138/111–117, 89, 138/100, 101, 102, 97–99
See application file for complete search history.

(56) References Cited

U.S. PATENT DOCUMENTS

| | | | | |
|---|---|---|---|---|
| 261,191 A | * | 7/1882 | Walker | 285/292.1 |
| 906,217 A | * | 12/1908 | Gaylord | 285/391 |
| 1,072,736 A | | 9/1913 | Kelly | |
| 1,939,936 A | | 12/1933 | Walker et al. | |
| 2,149,981 A | * | 3/1939 | Pedersen | 30/116 |
| 2,610,820 A | * | 9/1952 | Markel et al. | 251/225 |
| 2,627,429 A | * | 2/1953 | Engelman | 285/5 |
| 2,651,329 A | | 9/1953 | Fowler, Jr. | |
| 4,448,470 A | | 5/1984 | Peterson | |
| 5,114,250 A | | 5/1992 | Usui | |
| 5,873,608 A | | 2/1999 | Tharp et al. | |
| 7,000,952 B2 | | 2/2006 | Sternberger et al. | |
| 2004/0239103 A1 | | 12/2004 | Sternberger et al. | |

FOREIGN PATENT DOCUMENTS

FR    754873    11/1933

* cited by examiner

*Primary Examiner* — Victor MacArthur
*Assistant Examiner* — Jay R Ripley
(74) *Attorney, Agent, or Firm* — Oblon, Spivak, McClelland, Maier & Neustadt, L.L.P.

(57) ABSTRACT

A coupling system including a coupling for fastening to one end of a pipe via a fastening connection is provided. The coupling system includes a safety fastener device in the form of a sleeve surrounding the fastening connection and having a first end for welding to the pipe, and a hook-forming second end for co-operating with the coupling in such a manner that the hook is suitable for providing fastening between the coupling and the pipe in the event of the fastening connection is damaged.

8 Claims, 3 Drawing Sheets

COUPLING SYSTEM INCLUDING A SAFETY FASTENER DEVICE

CROSS-REFERENCE TO RELATED APPLICATIONS

This application is a division of U.S. application Ser. No. 12/136,402 filed Jun. 10, 2008, the entire contents of which are incorporated herein by reference. Application Ser. No. 12/136,402 is based upon and claims the benefit of priority from prior French Patent Application No. 0755636 filed Jun. 11, 2007.

The present invention relates to the field of pipe coupling systems used particularly, but not exclusively, in a helicopter turbine engine.

BACKGROUND OF THE INVENTION

The present invention relates more particularly to a coupling system comprising a coupling for fastening to one end of a pipe via a fastening connection.

Conventionally, such a coupling system enables the pipe to be coupled to a member of the turbine engine for the purpose of feeding the member with a fluid, such a liquid or a gas, e.g. for the purpose of delivering compressed air to hot portions of the turbine engine in order to cool them.

It is also well known that the fastening connection of a coupling mounted on a turbine engine is subjected to severe mechanical stresses because of the vibration generated by the turbine engine in operation, which can have harmful consequences leading to the fastening connection being damaged and to the junction breaking.

To reduce the risk of such breakage, it is known to double the number of pipes and couplings needed so as to ensure that fluid continues to be fed in the event of a junction breaking, with the redundant pipe then being the only pipe to supply fluid.

Pipe redundancy nevertheless presents various drawbacks such as cost, additional weight, bulk, and maintenance.

US 2004/239103 discloses a device for limiting separation between two pipes in an aircraft.

OBJECTS AND SUMMARY OF THE INVENTION

An object of the present invention is to provide a safe coupling system that does not suffer from the above-mentioned drawbacks and that makes it possible to ensure that fluid continues to be supplied in spite of the fastening connection being damaged or breaking.

The invention achieves its object by the fact that the coupling system of the invention further comprises safety fastener means in the form of a sleeve surrounding the fastening connection and having a first end for welding to the pipe and a hook-forming second end for co-operating with the coupling in such a manner that the hook is suitable for providing fastening between the coupling and the pipe in the event of the fastening connection being damaged, for the purpose of guaranteeing fluid supply with minimum leakage.

Thus, by means of the present invention, the safety fastener means are suitable for taking the place of the fastening connection so as to ensure that the coupling and the pipe remain fastened together.

Unlike prior art devices, it is thus not necessary to provide redundant pipes, the safety fastener means advantageously taking over the fastening function by means of the hook in the event of the fastening connection being damaged.

Preferably, the periphery of the sleeve is provided with openings enabling an external operator to see the fastening connection when the sleeve is fastened to the pipe. This advantageously enables a mechanic to view the state of the fastening connection, and where appropriate to detect visually when it is damaged.

By means of the invention, it is thus not necessary to disassemble the safety fastener means in order to diagnose deterioration of the fastening connection.

Appropriately, the hook is suitable for providing fastening between the coupling and the pipe only in the event of the fastening connection being damaged.

Thus, so long as the fastening connection is performing its fastening function, the safety fastener means do not contribute to providing fastening between the coupling and the pipe, such that, in advantageous manner, they are not subjected to mechanical loading.

In other words, the safety Eastener means remain unloaded so long as the fastening connecting is intact, or at any rate are damaged only very slightly.

This advantageously preserves the mechanical strength of the safety fastener means which is brought into use only in the event of the fastening connection being damaged.

Preferably, the first end of the sleeve is welded to the pipe via single annular weld, thus enabling fastening to be performed simply and quickly.

In the meaning of the invention, the term "damage" is used to designate a state in which the fastening connection no longer performs its fastening function. This state may arise before the connection breaks.

It can thus be understood that in the present invention the safety fastener means are suitable for taking over the fastening of the pipe to the coupling in the event of the fastening connection being damaged.

As soon as the fastening connection is damaged to such an extent that it is no longer be capable of performing its fastening function, the hook engages the coupling in order to retain it. Since the safety fastener means are themselves fastened to the pipe, it follows that fastening is advantageously reestablished between the pipe and the coupling.

Thus, in the invention, the safety fastener means are capable of fastening the coupling to the pipe, given that their mechanical strength has not been subjected to the stresses that have been suffered by the fastening connection, which stresses lie at the origin of the damage to said connection.

It can thus be understood that the present invention makes it possible advantageously to omit redundant pipes.

Advantageously, in the absence of damage to the fastening connection, clearance exists between the hook and the coupling.

Thus, in the absence of damage, i.e. in normal operation of the coupling system, there is no contact between the coupling and the safety fastener means, and as a result the safety fastener means are not subjected to loading.

In an advantageous embodiment, in the event of damage to the fastening connection, and in particular in the event of said fastening connection breaking, the safety fastener means move relative to the coupling through a distance that is no greater than the clearance, such that the hook comes into contact with the coupling in a manner suitable for preventing the coupling from moving relative to the safety fastener means. Since said means are fastened to the pipe, it will be understood that the pipe and the coupling are again fastened to each other via the hook.

In addition, the clearance constitutes the maximum distance through which the coupling and the pipe move relative to each other.

Advantageously, said clearance is axial clearance in the axial direction of a cylindrical portion that is to be engaged with the end of the pipe.

Preferably, the length of the cylindrical portion is not less than the clearance, such that the pipe does not disengage from the coupling in the event of the fastening connection being damaged.

Also, and preferably, the clearance lies in the range 0.1 millimeters (mm) to 0.5 mm.

An advantage of clearance having this value is that the hook is suitable for engaging the coupling rapidly in the event of the fastening connection being damaged, and conversely is sufficient to prevent the hook from coming into contact with the coupling during "normal" operation.

This clearance could also be radial or angular without going beyond the ambit of the present invention, it being understood that adjectives such as "axial", "radial", and "angular", are taken relative to an axis of the end of the pipe.

Advantageously, the fastening connection is an annular weld, and it is preferably made between the cylindrical portion and the pipe.

The first end of the sleeve is preferably welded to the outside surface of the pipe.

In a first embodiment of the present invention, the hook-forming second end is designed to be retained axially between the coupling and a retention plate.

Preferably, the retention plate is fastened to the coupling after the first end of the safety fastener means have been fastened to the pipe.

Preferably, the hook-forming second end has a plurality of fastener tabs for extending axially around a cylindrical portion extending from the coupling.

Specifically, two adjacent tabs define an opening allowing the fastening connection to be seen.

Preferably, the coupling system in this first embodiment comprises a straight coupling, i.e. the flow direction of fluid leaving the coupling is substantially parallel to the flow direction of fluid entering the coupling.

In a second embodiment of the present invention, the hook-forming second end is in the form of a ring with its inner periphery provided with studs.

Preferably, the studs extend radially relative to the sleeve-forming safety fastener means.

Preferably, the coupling system of this second embodiment comprises an angled coupling, i.e. the flow direction of the fluid leaving the coupling is at an angle relative to the flow direction of the fluid entering the coupling.

In this second embodiment, the coupling includes a cylindrical portion for engaging the end of the pipe, said cylindrical portion includes a first annular rib, and the studs are suitable for coming into abutment against the first annular rib in the event of damage to the fastening connection so at to prevent the pipe from becoming disengaged.

In an advantageously aspect of the second embodiment of the present invention, said cylindrical portion further includes a second annular rib such that the first and second annular ribs define a groove in which the studs are suitable for engaging so as to retain the sleeve on the coupling before the sleeve is fastened to the pipe.

Preferably, the first and second annular ribs co-operate with the studs to form a bayonet locking system having the advantage of being capable of retaining the sleeve while it is being fastened to the pipe.

BRIEF DESCRIPTION OF THE DRAWINGS

The invention can be better understood and its advantages appear better on reading the following description of embodiments given as non-limiting examples. The description refers to the accompanying drawings, in which.

MORE DETAILED DESCRIPTION

The coupling systems that are described in detail below are intended particularly, but not exclusively, for connecting compressed air pipes to members in a helicopter turbine engine.

Figure 1:
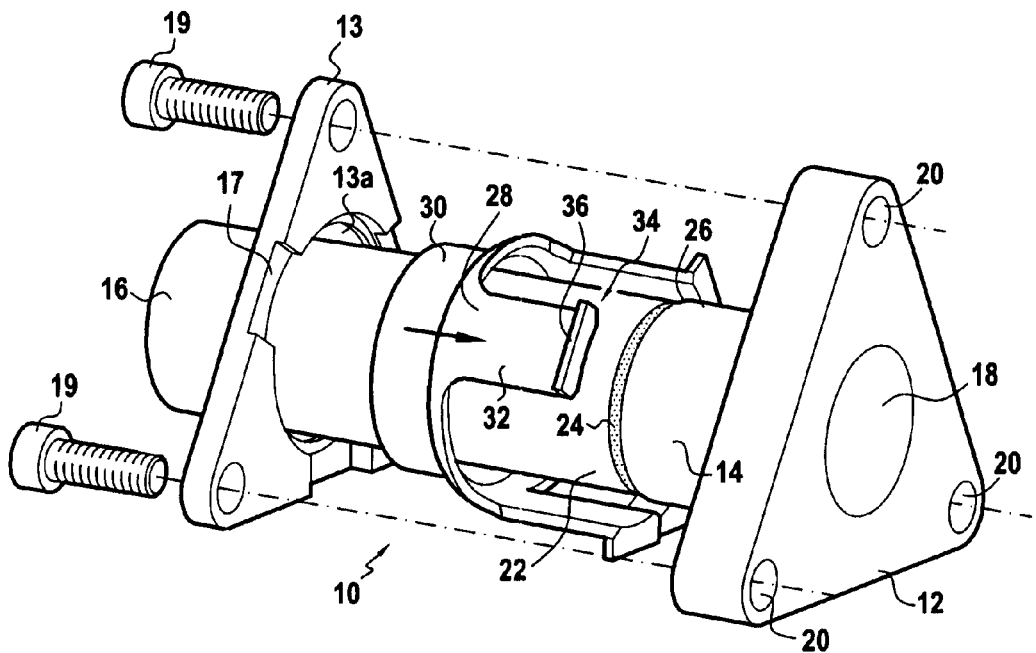
FIG. 1 is a perspective view of a coupling system constituting a first embodiment of the invention, a coupling being welded to the pipe while the safety fastener means are brought thereto in order to cause them to co-operate with the coupling.
Figure 2:
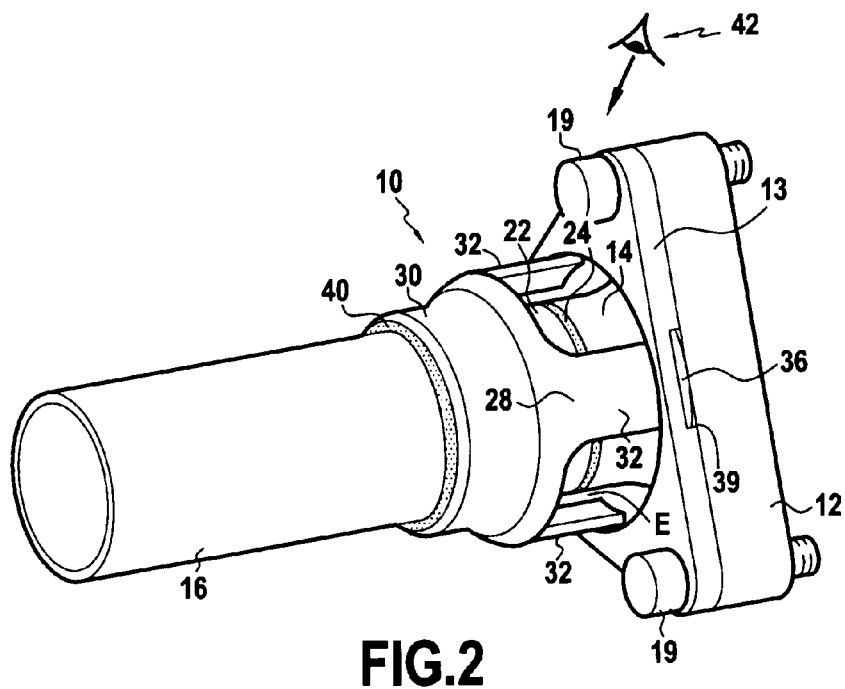
FIG. 2 is a perspective of the coupling system in the first embodiment of the invention, the safety fastener means being welded to the pipe and secured to the coupling.

With reference to FIGS. 1 and 2, a coupling system 10 constituting a first embodiment of the invention is described.

The coupling system 10 comprises a coupling 12 from which there extends a hollow cylindrical portion 14, which portion is to engage on a pipe 16 to make the connection between the coupling system 10 and the pipe 16.

Specifically, the coupling 12 is triangular in shape with rounded corners. Nevertheless, it is possible to provide some other shape without going beyond the ambit of the present invention.

The coupling 12 has a bore 18 passing therethrough and communicating coaxially with the hollow cylindrical portion 14.

As can be seen in FIG. 1, the coupling 12 has a plurality of orifices 20 for enabling the coupling 12 to be mounted on the member that is to be fed with compressed air, for example to a casing of the turbine engine.

With reference to FIGS. 1 and 2, it can be seen that the coupling 12 is for fastening to one end 22 of the pipe 16 via a fastening connection 24 which, specifically, is an annular weld 24 made between the peripheral surface of the pipe 16 and one end 26 of the cylindrical portion 14.

In this first embodiment, it can be seen that the coupling 12 is a straight coupling, the axis of the end of the pipe 16 being substantially parallel to the axis of the bore 18;

In accordance with the invention, the coupling 12 further includes safety fastener means 28 that, in this embodiment, are in the form of a sleeve 28 for surrounding the pipe 16.

The sleeve 28 has an annular first end 30 from which three fastener tabs 32 extend axially.

As shown in FIG. 1, the sleeve 28 also includes a second end 34 that is constituted in this embodiment by the ends of the fastener tabs 32.

In FIG. 1, it can be seen that each of the ends of the fastener tabs 32 has a respective projection 36 extending radially to form a hook, such that the second end 34 of the sleeve 28 itself forms a hook.

With reference to FIGS. 1 and 2, it can be seen that the coupling system 10 further includes a retention plate 13 that has the same triangular shape as the coupling 12. As can be seen in FIG. 1, the retention plate 13 has a hole 13a centered on the axis of the pipe 16 so that it can slide along the pipe 16. It also has three notches 17 for receiving the hook-forming ends 34.

With reference to FIG. 2, it can be understood that, while the sleeve 28 is being mounted, it slides on the pipe towards the coupling so that the projections 36 of the fastener tabs 32 come to bear against the coupling 12.

Thereafter, the retention plate 13 is brought against the coupling 12 by causing it to slide axially so that each of the projections 36 is received between the coupling 12 and a notch 17 in the retention plate 13, after which the retention plate 13 is secured to the coupling, e.g. by means of screws 19. Thus, the sleeve 28 is held between the coupling 12 and the retention plate 13, the fastener tabs 32 then extending in the axial direction of the cylindrical portion 14.

In particularly advantageous manner, the axial width of the slots 39 defined by associating the notches 17 with the coupling 12 is greater than the axial thickness of the projections 36, so that axial clearance exists between the sleeve 28 and the coupling 12.

Preferably, but not necessarily, the circumferential length of the slots 39 is also longer than the circumferential length of the projections 36 so that angular clearance exists between the coupling 12 and the sleeve 28.

Once the sleeve 28 is retained between the coupling 12 and the retention plate 13, the sleeve 28 is fastened to the pipe 16, preferably by means of an annular welded connection 40 made between the first end 30 of the sleeve 28 and the peripheral surface of the pipe 16, as shown in FIG. 2.

Preferably, the sleeve 28 is fastened to the pipe 16 while ensuring that the projections 36 are not in contact with the inside edges of the slots 39. In other words, care is taken to ensure that in the absence of any damage to the fastening connection 24, clearance exists between the hook-forming projections 36 and the edges of the slots 39.

Thus, and in preferred manner, in the absence of damage, there is no contact between the sleeve 28 and the coupling 12.

Specifically, axial clearance is provided in the axial direction of the cylindrical portion 14. Preferably, the clearance lies in the range 0.1 mm and 0.5 mm.

By means of this advantageous configuration, the sleeve 28, and consequently the weld fastening the sleeve 28 to the pipe 16, is not subjected to loading so long as the fastening connection 24 is undamaged.

Providing the hook-forming projections 36 are not in contact with the coupling, it will be understood that in normal operation of the coupling system 10, no mechanical force is exerted directly by the coupling 12 on the sleeve 28.

Thus, in the absence of damage to the fastening connection 24, the sleeve 28, and more particularly the weld 40 fastening the sleeve 28 to the pipe 16, is/are not subjected to mechanical force, unlike the fastening connection 24. As a result, the fastening capacity of the safety fastener means is advantageously preserved.

Conversely, in the event of damage to the fastening connection 24, and in particular in the event of said connection breaking, the pipe 16 tends to separate from the cylindrical portion 14, and as a consequence the hook-forming projections 36 come into abutment against the edges of the slots 39, thereby exerting contact between the second end 34 of the hook-forming sleeve 28 and the coupling 12, after which the second end 24 of the hook-forming sleeve 28 provides fastening between the coupling 12 and the pipe 16, it being recalled that the sleeve 28 is itself welded to the pipe 16 by the weld 40.

In another advantageous aspect of the invention, the space E defined between two adjacent fastener tabs constitutes an opening making it possible for an external operator 42, e.g. a mechanic doing maintenance on the turbine engine, to see the fastening connection 24 while the sleeve 28 is fastened to the pipe.

This makes it possible advantageously to diagnose the state of the fastening connection 24 so as to identify whether it has suffered any damage.

Without going beyond the ambit of the present invention, provision can be made for a variant in which the sleeve is retained directly by the coupling 12 in the absence of a retention plate.

An advantageous second embodiment of a coupling system 110 of the present invention is described below with reference to FIGS. 3 to 6.

Elements in the second embodiment that are identical to elements of the first embodiment are given the same numerical reference plus 100.

Figure 3:
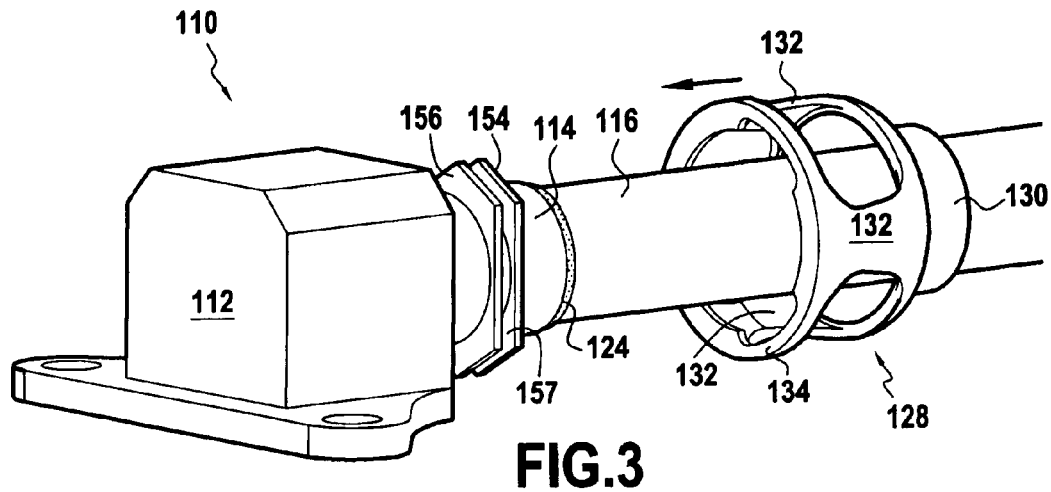
FIG. 3 is a perspective view of the coupling system in a second embodiment of the invention, the coupling being welded to the pipe while the sleeve-forming safety fastener means are brought thereto in order or co-operate with annular ribs disposed on a cylindrical portion of the coupling.

FIG. 3 shows the coupling system 110 which includes a right-angled coupling 112. In other words, the flow direction of the fluid entering the coupling 112 is at right angles to the flow direction of the fluid Leaving the coupling. The device of the invention can be applied regardless of the value of this angle.

As in the first embodiment, a hollow cylindrical portion 114 for engaging on the end of a pipe 116 extends from the coupling 112.

The coupling 112 and the pipe 116 are for fastening together by means of a fastening connection 124 forming an annular weld.

In accordance with the invention, the coupling system 110 further includes safety fastener means 128 forming a sleeve. The sleeve 128 can be seen more particularly in FIG. 5.

Figure 5:
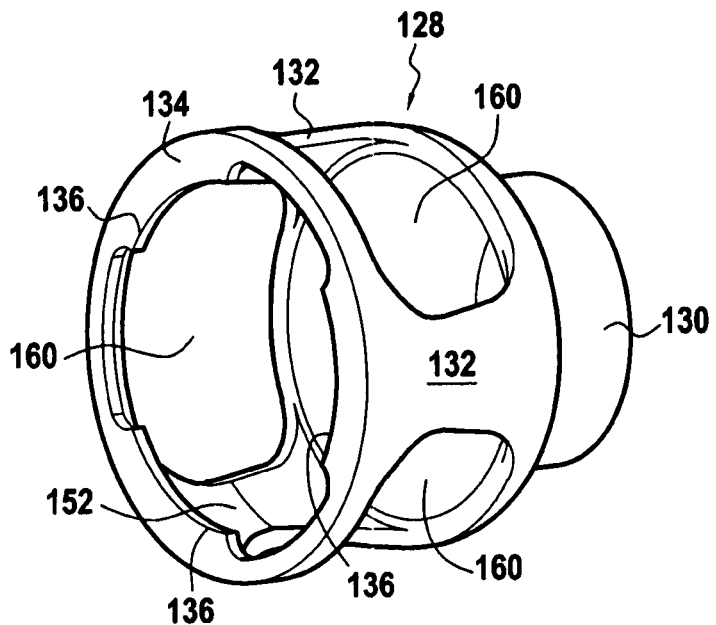
FIG. 5 is a perspective view of the coupling sleeve in the second embodiment of the invention.

With reference to FIG. 5, it can be seen that the sleeve 128 comprises an annular first end 130, and an annular second end 134 forming a ring of inner outline provided with three separate studs 136 extending angularly, while also projecting radially towards the axis of the sleeve 128. It can thus be understood that the second end 134 of the sleeve 128 forms a hook.

The first and second ends 130 and 134 are connected together by three axially-extending arms 132.

FIG. 3 shows the coupling 112 welded to the pipe 116, while the sleeve 128 is being moved into place for mounting on the coupling 112.

As can be seen in this figure, the cylindrical portion 114 has a first annular rib 154, and preferably a second annular rib 156 about the same axis as the first rib 154.

Furthermore, the first annular rib 154 has radially projecting projections, specifically three lugs in this embodiment.

In the example shown, the second rib 156 is similar to the first rib 154, but that is not essential.

With reference to FIGS. 3 and 5, there follows an explanation of how the sleeve 128 is mounted. Firstly, the sleeve 128 slides along the pipe 116 towards the coupling 112.

Thereafter, the sleeve 128 is positioned angularly in such a manner that each of the studs 136 is situated angularly between two lugs 158, thereby enabling the sleeve 128 to be positioned axially in such a manner that the studs engage into a groove 157 defined axially between the first and second annular ribs 154, 156.

Figure 6:
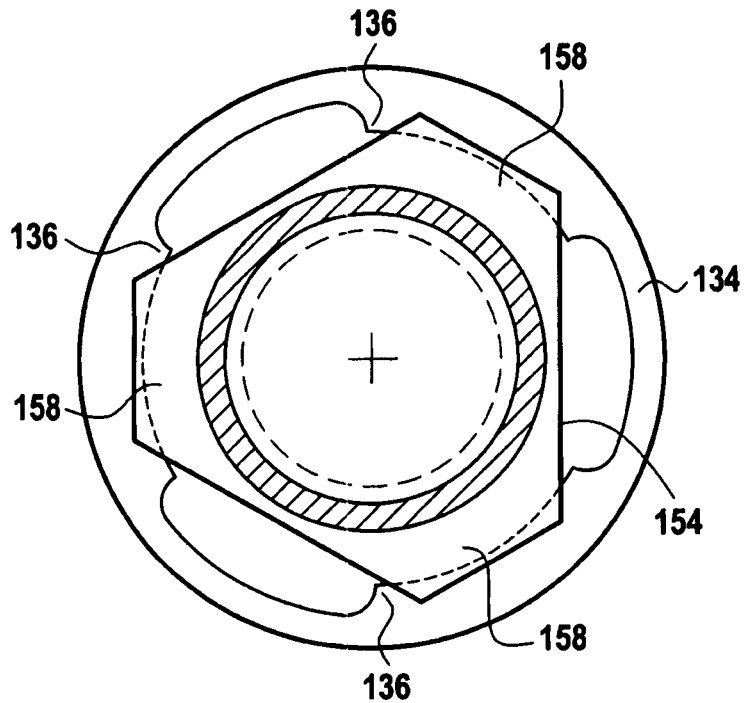
FIG. 6 is a detail view in cross-section showing the coupling sleeve in the second embodiment of the invention, and showing the position of the first annular rib relative to the hook-forming second end.

Once the studs 136 are in position in the groove 157, the sleeve 128 is pivoted about its axis to the angular position shown in FIG. 6, in which the studs 136 are in the same angular position as the lugs 158.

From FIG. 6, it can be understood that in this position, the sleeve 128 is held axially, thereby making it easier to fasten the sleeve 128 to the pipe 116.

In particularly advantageous manner, the axial distance between the first and second annular ribs is greater than the axial distance of the studs 136 so that axial clearance exists between the coupling 112 and the sleeve 128. This clearance preferably lies in the range 0.1 mm to 0.5 mm.

Figure 4:
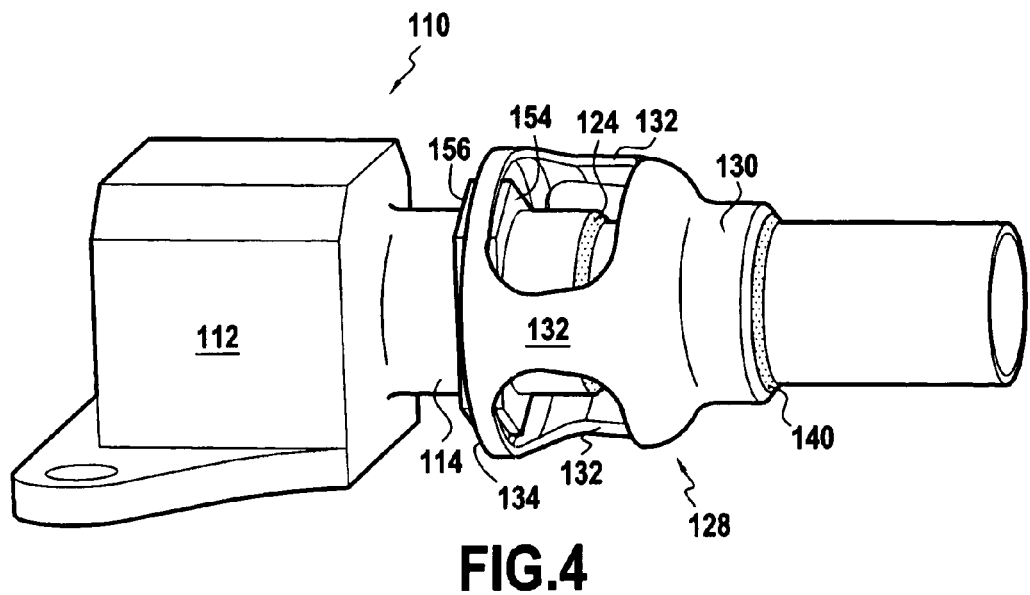
FIG. 4 is a perspective view of the second embodiment of the invention, the safety fastener means being engaged with the coupling and then welded to the pipe.

When the sleeve is in this position, with the studs 136 preferably not coming into contact with either of the first and second ribs 154, 156, the first end 130 of the sleeve 128 is fastened to the peripheral surface of the pipe 116 by an annular weld 140 as can be seen clearly in FIG. 4.

It can thus be understood that, in the absence of damage to the fastening connection 124, the hook-forming second end 134 of the sleeve 128 is preferably not in contact with the ribs of the coupling 112, and as a result the sleeve 128 is not subjected to loading.

Conversely, as soon as the fastening connection 124 is damaged, the pipe 116 tends to separate from the cylindrical portion 114, in particular because of the vibration generated by the turbine engine. This leads to the sleeve 128 moving axially, said axial movement advantageously being limited because of the axial blocking performed by the studs 136 of the sleeve 128 coming into contact with the lugs 158 of the annular ribs 154, 156 of the coupling 112.

In other words, the hook-forming studs 136 are suitable for providing fastening between the coupling 112 and the pipe 116 in the event of the fastening connection 124 being damaged.

Furthermore, it can be seen in FIG. 4 that the peripheral surface of the sleeve has openings 160 that are defined between two adjacent arms 132.

As in the first embodiment, these openings 160 enable an outside operator to see the fastening connection 124 when the sleeve 128 is fastened to the pipe 116, advantageously in order to diagnose any damage to the connection.

The invention also provides a turbomachine such as a turbine engine including a coupling system in accordance with the present invention.

What is claimed is:

1. A coupling system comprising:
    a coupling which is fastened to one end of a pipe via a fastening connection, the coupling comprising a cylindrical portion engaging the end of the pipe, wherein said cylindrical portion includes a first annular rib having an outer periphery provided with at least one radially outward projecting lug;
    a sleeve surrounding the fastening connection and having a first end welded to the pipe and second end in the form of a ring with its inner periphery provided with at least one radially inward projecting stud placed so as to abut against a respective at least one lug if the fastening connection breaks, the at least one stud provides fastening between the coupling and the pipe in the event of the fastening connection breaking by abutting a respective at least one lug.

2. A coupling system according to claim 1, wherein the fastening connection is an annular weld.

3. A coupling system according to claim 1, wherein the periphery of the sleeve is provided with openings enabling an external operator to see the fastening connection when the sleeve is fastened to the pipe.

4. A coupling system according to claim 1, wherein said cylindrical portion further includes a second annular rib such that the first and second annular ribs define a groove therebetween in which the at least one stud is suitable for engaging so as to retain the sleeve on the coupling before the sleeve is fastened to the pipe.

5. A coupling system according to claim 1, wherein the at least one stud is a plurality of studs, extend circumferentially, and are circumferentially spaced from one another.

6. A coupling system according to claim 1, wherein when the fastening connection is not broken, clearance exists between the at least one stud and the respective at least one lug.

7. A coupling system according to claim 6, wherein said clearance is axial clearance in the axial direction of said cylindrical portion.

8. A coupling system according to claim 6, wherein the clearance lies in the range 0.1 mm to 0.5 mm.

* * * * *